United States Patent
Welton et al.

(10) Patent No.: US 9,454,573 B1
(45) Date of Patent: Sep. 27, 2016

(54) PARALLEL PROCESSING DATABASE SYSTEM WITH A SHARED METADATA STORE

(71) Applicant: EMC Corporation, Hopkinton, MA (US)

(72) Inventors: Caleb Welton, Foster City, CA (US); Hitoshi Harada, Foster City, CA (US); Jeffrey Cohen, Sunnyvale, CA (US); Lei Chang, Beijing (CN); Radhika Reddy, Cupertino, CA (US); Tao Ma, Beining (CN); Zhanwei Wang, Beijing (CN)

(73) Assignee: EMC Corporation, Hopkinton, MA (US)

( * ) Notice: Subject to any disclaimer, the term of this patent is extended or adjusted under 35 U.S.C. 154(b) by 130 days.

(21) Appl. No.: 13/838,749

(22) Filed: Mar. 15, 2013

Related U.S. Application Data (60) Provisional application No. 61/769,043, filed on Feb. 25, 2013.

(51) Int. Cl.
*G06F 7/00* (2006.01)
*G06F 17/30* (2006.01)

(52) U.S. Cl.
CPC ................ *G06F 17/30463* (2013.01)

(58) Field of Classification Search
CPC .......... G06F 17/30536; G06F 17/30038; Y10S 707/99943
USPC .................................................. 707/718
See application file for complete search history.

(56) References Cited

U.S. PATENT DOCUMENTS

| | | | |
|---|---|---|---|
| 5,857,180 A | 1/1999 | Hallmark et al. | |
| 6,219,692 B1 | 4/2001 | Stiles | |
| 6,678,695 B1 * | 1/2004 | Bonneau | G06F 17/30528 |
| 6,928,451 B2 | 8/2005 | Mogi et al. | |
| 7,051,034 B1 | 5/2006 | Ghosh et al. | |
| 7,072,934 B2 | 7/2006 | Helgeson et al. | |
| 7,447,786 B2 | 11/2008 | Loaiza et al. | |
| 7,849,073 B2 | 12/2010 | Young-Lai | |
| 7,873,650 B2 | 1/2011 | Chapman et al. | |
| 7,877,379 B2 | 1/2011 | Waingold et al. | |
| 8,051,052 B2 | 11/2011 | Jogand-Coulomb et al. | |
| 8,060,522 B2 | 11/2011 | Birdwell et al. | |
| 8,171,018 B2 | 5/2012 | Zane et al. | |
| 8,195,705 B2 | 6/2012 | Calvignac et al. | |
| 8,209,697 B2 | 6/2012 | Kobayashi et al. | |
| 8,239,417 B2 | 8/2012 | Gu et al. | |
| 8,370,394 B2 | 2/2013 | Atta et al. | |
| 8,788,464 B1 * | 7/2014 | Lola | G06F 17/30584 707/661 |
| 8,832,078 B2 | 9/2014 | Annapragada et al. | |
| 8,886,631 B2 | 11/2014 | Abadi et al. | |

(Continued)

OTHER PUBLICATIONS

"Greenplum Database 4.1 Administrator Guide", 2011.*

(Continued)

*Primary Examiner* — Binh V Ho
(74) *Attorney, Agent, or Firm* — Van Pelt, Yi & James LLP (57) ABSTRACT

A method and system for executing database queries in parallel using a shared metadata store. The metadata store may reside on a master node, and the master node may distribute this metadata with query plans to worker nodes. The worker nodes may request additional metadata from the master node when necessary.

22 Claims, 6 Drawing Sheets

(56) References Cited

U.S. PATENT DOCUMENTS

| | | | |
|---|---|---|---|
| 8,935,232 B2 | 1/2015 | Abadi et al. | |
| 9,002,824 B1 | 4/2015 | Sherry et al. | |
| 2003/0145047 A1 | 7/2003 | Upton | |
| 2003/0204427 A1 | 10/2003 | Gune et al. | |
| 2003/0208458 A1 | 11/2003 | Dettinger et al. | |
| 2003/0229627 A1 | 12/2003 | Carlson et al. | |
| 2003/0229639 A1 | 12/2003 | Carlson et al. | |
| 2003/0229640 A1 | 12/2003 | Carlson et al. | |
| 2004/0039729 A1 | 2/2004 | Boger et al. | |
| 2004/0103087 A1 | 5/2004 | Mukherjee et al. | |
| 2004/0128290 A1* | 7/2004 | Haas | G06F 17/30489 |
| 2004/0177319 A1* | 9/2004 | Horn | G06F 17/3002 715/205 |
| 2004/0215626 A1* | 10/2004 | Colossi | G06F 17/30312 |
| 2005/0193035 A1* | 9/2005 | Byrne | G06F 11/1471 |
| 2005/0209988 A1 | 9/2005 | Cunningham et al. | |
| 2005/0278290 A1* | 12/2005 | Bruce | G06F 17/30592 |
| 2006/0149799 A1* | 7/2006 | Wong | G06F 17/30575 |
| 2007/0203893 A1 | 8/2007 | Krinsky et al. | |
| 2008/0016080 A1* | 1/2008 | Korn | G06F 17/30415 |
| 2009/0327242 A1 | 12/2009 | Brown et al. | |
| 2010/0094716 A1* | 4/2010 | Ganesan et al. | 705/26 |
| 2010/0198855 A1* | 8/2010 | Ranganathan | G06F 17/30445 707/764 |
| 2011/0041006 A1 | 2/2011 | Fowler | |
| 2011/0060732 A1* | 3/2011 | Bonneau et al. | 707/722 |
| 2011/0228668 A1 | 9/2011 | Pillai et al. | |
| 2011/0302151 A1 | 12/2011 | Abadi et al. | |
| 2011/0302226 A1 | 12/2011 | Abadi et al. | |
| 2011/0302583 A1* | 12/2011 | Abadi et al. | 718/102 |
| 2012/0030220 A1 | 2/2012 | Edwards et al. | |
| 2012/0117120 A1 | 5/2012 | Jacobson et al. | |
| 2012/0166417 A1* | 6/2012 | Chandramouli | G06F 17/30516 707/713 |
| 2012/0191699 A1* | 7/2012 | George et al. | 707/718 |
| 2012/0203765 A1* | 8/2012 | Ackerman | G06F 17/30038 707/722 |
| 2012/0303669 A1* | 11/2012 | Chmiel | G06Q 10/10 707/797 |
| 2012/0310916 A1 | 12/2012 | Abadi et al. | |
| 2013/0041872 A1 | 2/2013 | Aizman et al. | |
| 2013/0086039 A1 | 4/2013 | Salch et al. | |
| 2013/0144878 A1 | 6/2013 | James et al. | |
| 2013/0179474 A1* | 7/2013 | Charlet | G06F 17/30286 707/802 |
| 2013/0282650 A1 | 10/2013 | Zhang et al. | |
| 2013/0332478 A1 | 12/2013 | Bornea et al. | |
| 2014/0032528 A1 | 1/2014 | Mandre et al. | |
| 2014/0067792 A1 | 3/2014 | Erdogan et al. | |
| 2014/0108861 A1 | 4/2014 | Abadi et al. | |
| 2014/0114952 A1* | 4/2014 | Robinson | G06F 17/30445 707/718 |
| 2014/0114994 A1 | 4/2014 | Lindblad et al. | |
| 2014/0156636 A1* | 6/2014 | Bellamkonda | G06F 17/30489 707/718 |
| 2014/0188825 A1 | 7/2014 | Muthukkaruppan et al. | |

OTHER PUBLICATIONS

"Parallel Processing & Pallel Database", 1997, Oracle.*
"Greenplum Database: Critical Mass Innovation", 2010.*
Borthakur et al., "Apache Hadoop Goes Realtime at Facebook", 2011, ACM.
Zaharia et al., "Resilient Distributed Datasets: A Fault-Tolerant Abstraction for In-Memory Cluster Computing", 2011, Princeton, cs.princeton.edu.
Zhao et al, "Research of P2P Architecture based on Cloud Computing", 2010, IEEE.
B. Hedlund, "Understanding Hadoop Clusters and the Network", 2011, bradhedlund.com/2011/09/10/understanding-hadoop-clusters and the network.
Shafer et al., "The Hadoop Distributed Filesystem: Balancing Portability and Performance", 2010, IEEE.
Wang et al. "Hadoop High Availability through Metadata Replication", 2009, ACM.
Nguyen et al., "A MapReduce Workflow System for Architecting Scientific Data Intensive Applications", 2011, ACM.
C. Zhang, "Enhancing Data Processing on Clouds with Hadoop/HBase", 2011, University of Waterloo, Waterloo, Ontario,Canada, 2011. www.uwspace.uwaterloo.ca/handle/10012/6361.
K. Elmeleegy, "Piranha: Optimizing Short Jobs in Hadoop", Aug. 30, 2013, Proceedings of the VLDB Endowment.
Hsu et al., "A Cloud Computing Implementation of XML Indexing Method Using Hadoop", 2012, Springer-Verlag.
Shvachko et al., "The Hadoop Distributed File System" 2010, IEEE.

* cited by examiner

PARALLEL PROCESSING DATABASE SYSTEM WITH A SHARED METADATA STORE

CROSS REFERENCE TO RELATED APPLICATIONS

This application claims priority to U.S. Provisional Patent Application No. 61/769,043 for INTEGRATION OF MASSIVELY PARALLEL PROCESSING WITH A DATA INTENSIVE FRAMEWORK file on Feb. 25, 2013, which is incorporated herein by reference for all purposes.

This application is related to co-pending U.S. patent application Ser. No. 13/838,955 for PROCESSING A DATABASE QUERY USING A SHARED METADATA STORE, U.S. patent application Ser. No. 13/839,171 for PARALLEL PROCESSING DATABASE TREE STRUCTURE, and U.S. patent application Ser. No. 13/839,390 for PARALLEL PROCESSING DATABASE SYSTEM, filed concurrently herewith, which is incorporated herein by reference for all purposes.

FIELD OF THE INVENTION

This invention relates generally to parallel processing databases, and more particularly to systems and methods for using a shared metadata catalog.

BACKGROUND OF THE INVENTION

Database systems are used to house digital information for a variety of applications and users. These systems may house thousands of terabytes or petabytes of information, all of which may need to be quickly searched and analyzed at a user's request. Occasionally, these search and analysis requests may be computationally intensive for a single machine, and the query tasks may be distributed among multiple nodes in a cluster Massively parallel processing ("MPP") databases may be used to execute complex database queries in parallel by distributing the queries to nodes in a cluster. Each node may receive a portion of the query and execute it using a local metadata store. Occasionally, data may be replicated between the nodes in a cluster, thereby reducing consistency and increasing maintenance costs.

There is a need, therefore, for an improved method, article of manufacture, and apparatus for performing queries on a distributed database system.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION

A detailed description of one or more embodiments of the invention is provided below along with accompanying figures that illustrate the principles of the invention. While the invention is described in conjunction with such embodiment(s), it should be understood that the invention is not limited to any one embodiment. On the contrary, the scope of the invention is limited only by the claims and the invention encompasses numerous alternatives, modifications, and equivalents. For the purpose of example, numerous specific details are set forth in the following description in order to provide a thorough understanding of the present invention. These details are provided for the purpose of example, and the present invention may be practiced according to the claims without some or all of these specific details. For the purpose of clarity, technical material that is known in the technical fields related to the invention has not been described in detail so that the present invention is not unnecessarily obscured.

It should be appreciated that the present invention can be implemented in numerous ways, including as a process, an apparatus, a system, a device, a method, or a computer readable medium such as a computer readable storage medium or a computer network wherein computer program instructions are sent over optical or electronic communication links. Applications may take the form of software executing on a general purpose computer or be hardwired or hard coded in hardware. In this specification, these implementations, or any other form that the invention may take, may be referred to as techniques. In general, the order of the steps of disclosed processes may be altered within the scope of the invention.

An embodiment of the invention will be described with reference to a data storage system in the form of a storage system configured to store files, but it should be understood that the principles of the invention are not limited to this configuration. Rather, they are applicable to any system capable of storing and handling various types of objects, in analog, digital, or other form. Although terms such as document, file, object, etc. may be used by way of example, the principles of the invention are not limited to any particular form of representing and storing data or other information; rather, they are equally applicable to any object capable of representing information.

Figure 1:
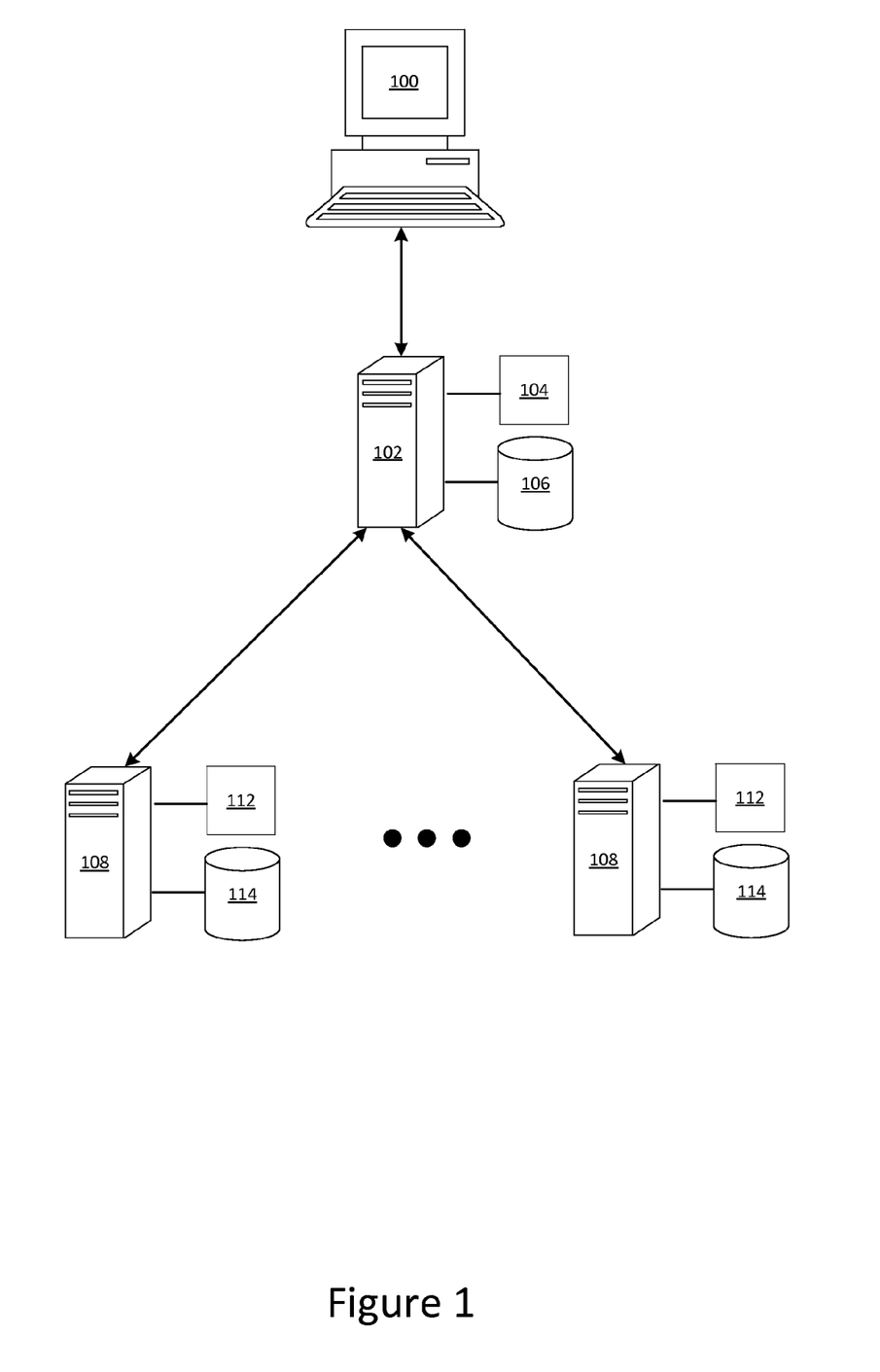
FIG. 1 illustrates a parallel processing database architecture in accordance with some embodiments of the present disclosure.

With reference to FIG. 1, a parallel processing database architecture consistent with an embodiment of the present disclosure is discussed. Client 100 may submit a query, such as an SQL database query, to master node 102. Master node 102 may comprise processor 104 and non-transitory computer readable medium 106. Master node 102 may derive one or more query plans based on the query received from client 100, and thereafter transmit the query plans to worker nodes 108. A query plan may be, for example, a set of instructions for performing a data operation on a database. In an embodiment, worker nodes 108 may include processors 112 and non-transitory computer readable storage mediums 114. Worker nodes 108 may process the query plans in parallel, and then return their results to master node 102. Master node 102 may compile all the received results, and return a final query result to client 100.

In some embodiments, worker nodes may need query metadata to execute the received query plans. Query metadata may include, for example, database table definitions, user or system defined database functions, database views, and/or database indexes. In some embodiments, this metadata may be maintained by catalogs on every worker node in the system. For example, these catalogs may be stored in non-transitory computer readable mediums 114.

While maintaining the catalogs on every node may be manageable on smaller systems, such as system with one or two machines, such maintenance may not be scalable as the database cluster grows. For example, if a database cluster comprises ten thousand nodes, and if each node contains a local metadata catalog, maintaining those catalogs may be unwieldy or impossible. Even a minor change may need to be replicated among the ten thousand different nodes, and each replication presents a risk of error. As the cluster size grows, this risk increases. Further, storing the catalog on every node in the system may not be an efficient use of storage resources. Even if the catalog only consumes a small amount of storage space, this storage space may be significant when aggregated over thousands of nodes.

Figure 2:
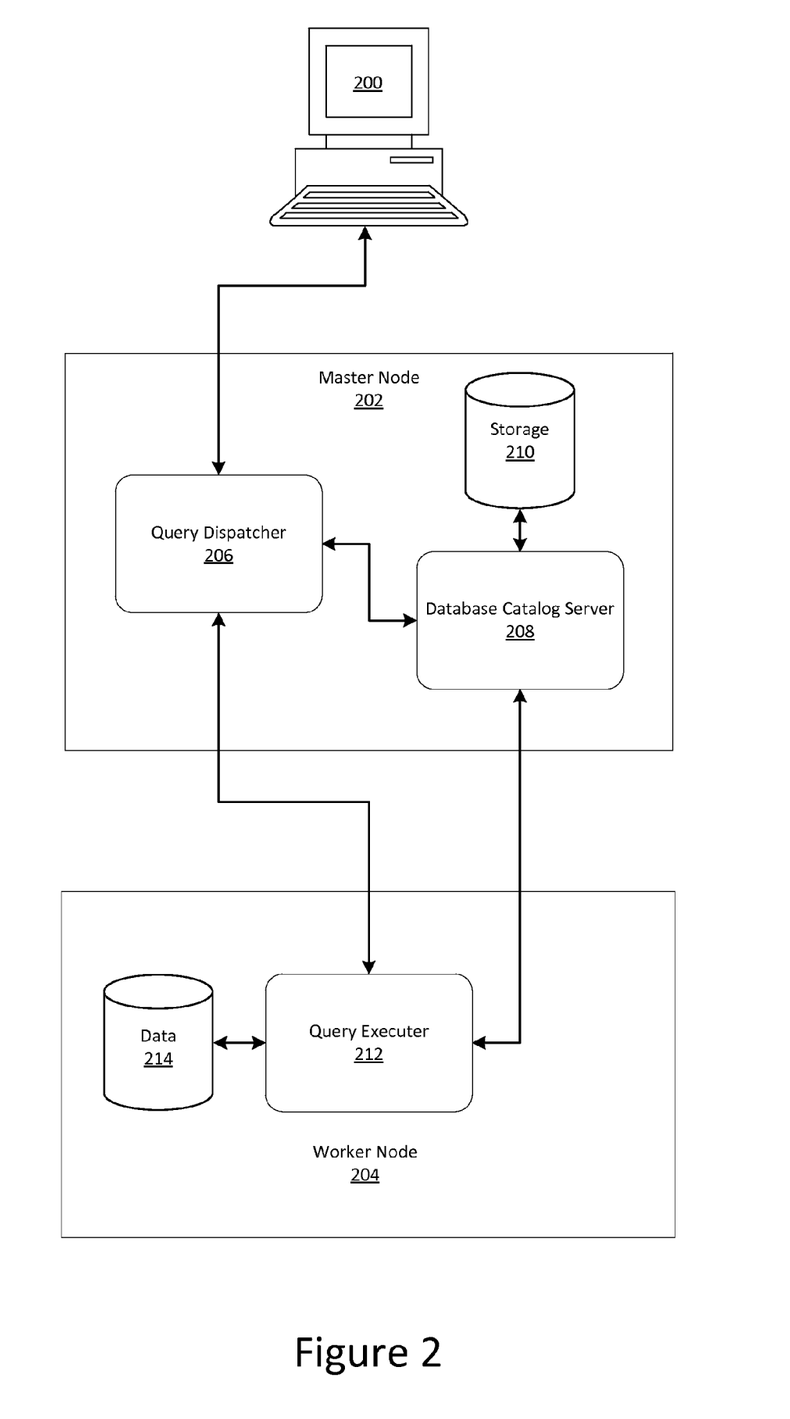
FIG. 2 illustrates a parallel processing database have a shared metadata catalog in accordance with some embodiments of the present invention.

In order to address these challenges, a database system may use the master node/worker node architecture shown in FIG. 2. Client 200 may submit a query, such as an SQL query, to master node 202. Master node 202 may develop a query plan from the query, and forward that plan to worker node 204 for execution. In an embodiment, client 200 may be similar to client 100, master node 202 may be similar to master node 102, and worker node 204 may be substantially similar to worker nodes 108. While only one worker node is shown in FIG. 2, any number of nodes may be used in the database cluster.

The query from client 200 may be received by query dispatcher 206. In an embodiment, query dispatcher 206 develops query plans from the received query. Query dispatcher may also determine what metadata may be necessary for the execution of the query plans, and retrieve that metadata from database catalog server 208 (the "metadata catalog" or "database catalog"). This metadata may be identified while interpreting the received query and developing the query plans. In an embodiment, the database catalog may be stored on a non-transitory computer readable medium, such as storage 210. Query dispatcher may then transmit both the retrieved metadata and the query plan to worker node 204.

Transmitting the metadata data along with the query plan from master node 202 allows the database catalog to be maintained at a single location; namely, master node 202. Since worker node 204 receives the query plan along with the metadata, it does not need to maintain a local metadata catalog. When a change is made to the catalog, it may be made a single location and may not need to be propagated to other nodes in the cluster. This may decrease maintenance costs, improve reliability, increase the amount of available space in the cluster, and improve scalability.

In an embodiment, the query plan is annotated to include the metadata, and the plan and metadata are transmitted at the same time. Additionally or alternatively, the query plan and metadata may be transmitted separately. For example, the metadata may be transmitted to worker node 204 before or after the query plan.

Once worker node 204 has received the plan and the metadata, query executer 212 may execute the query plan. In some embodiments, this execution may involve a performing a data operation on data 214. Data 214 may be stored on a computer readable medium, such as medium 114. In some embodiments, the metadata received from master node 202 may not be sufficient to fully execute the query plan. Should query executor 212 need additional metadata, it may send a request back to database catalog server 208. Catalog server 208 may retrieve the additional metadata, transmit it back to query executor 212, and the query executor may complete the query.

In an embodiment, a separate catalog server session is established for each query request. For example, when a request is received a catalog server session may be initiated, where that server session includes a snapshot of the metadata catalog. In an embodiment, this snapshot is taken when the query is executed. The metadata initially transmitted to the worker nodes may be retrieved from that session, and any incoming request for additional metadata may retrieve the additional metadata from the same session. This may ensure that the metadata remains consistent throughout query execution. For example, if a session is not used, the query dispatcher may distribute query plans with the metadata, the metadata may then change on the database catalog server or computer readable medium, and a worker node may make a request for additional metadata. In response, the catalog server may distribute the modified metadata which is not consistent with the original query. Initiating separate catalog server processes may alleviate this problem.

Figure 3:
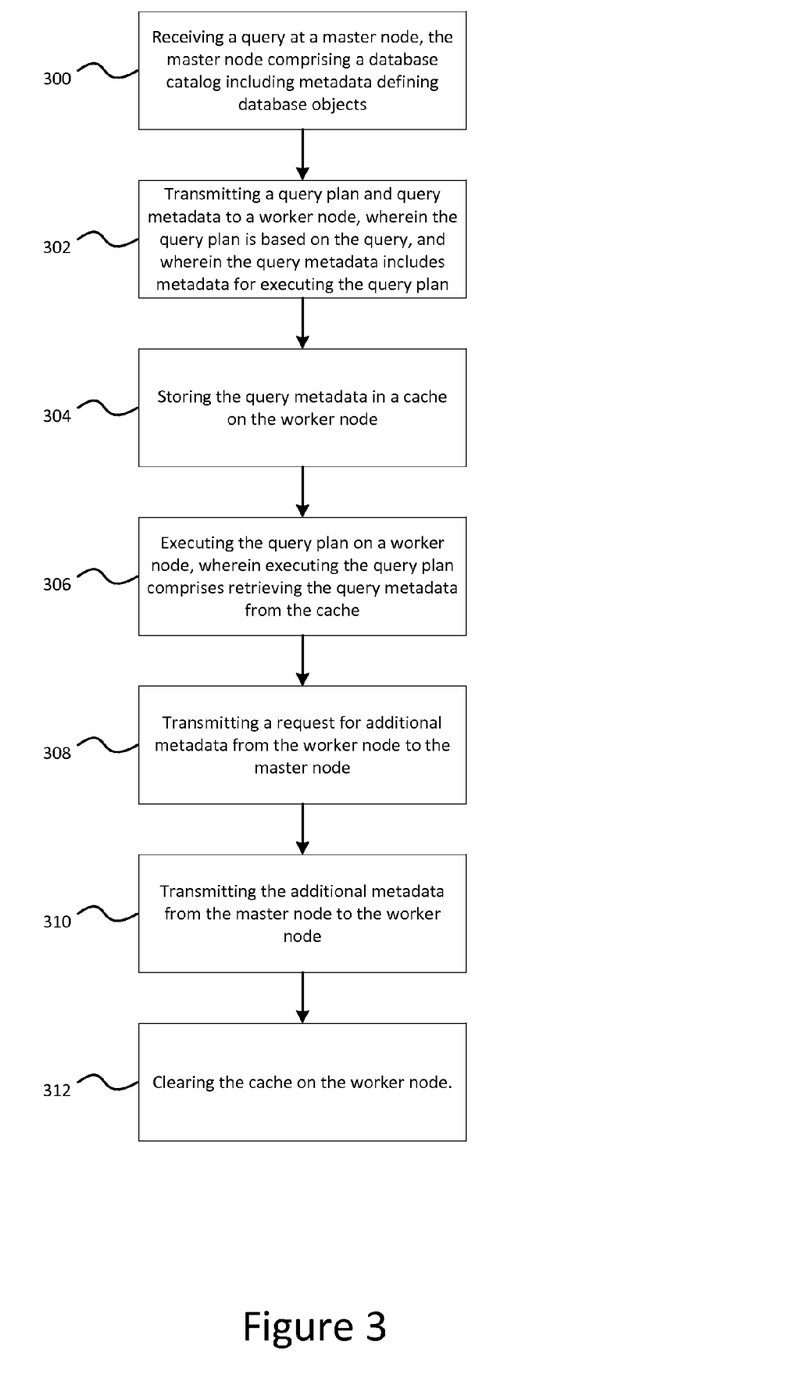
FIG. 3 is a flowchart of a method for executing a query using a shared metadata catalog in accordance with some embodiments of the present invention.

Turning now to FIG. 3, a method for executing a query on a system substantially similar to FIG. 2 is discussed. At 300, a query is received at a master node. This query could be received, for example, from client 100. The master node may comprise a database catalog which includes metadata defining database objects. This database catalog may be managed by database catalog server 208, and stored on storage 210. In an embodiment, the metadata may include database table definitions, user or system defined database functions, database views, and/or database indexes.

At 302, a query plan and query metadata are transmitted to a worker node for execution. The query plan may be based on the received query, and may comprise an execution strategy for completing all or a portion of the query. The query metadata may include metadata needed for executing the query plan. For example, if the query plan involves a user defined function, that function may be included in the transmitted metadata.

At 304, the metadata may be stored a local cache on the worker node. This cache could exist, for example, in a memory such as random access memory ("RAM"). Storing the metadata in cache allows for rapid retrieval during the execution process and reduces the number of call backs from the worker node to the metadata catalog on the master node.

At block 306, the query plan is executed on the worker node. The query execution may require use of metadata, and that metadata may be retrieved from the worker cache.

At 308, the worker may determine that it needs additional metadata to execute the query, and may transmit a request for that metadata back to the master node. In some embodiments, this transmission may be received by a catalog server, such as metadata catalog server 208. Additionally or alternatively, the transmission may be received and processed by a catalog server session as discussed above.

At 310, the additional requested metadata may be transmitted from the master to the worker, and the query execution may continue. At block 312, once the execution is complete, the cache may be cleared and the query result may be returned to the master node.

Figure 4:
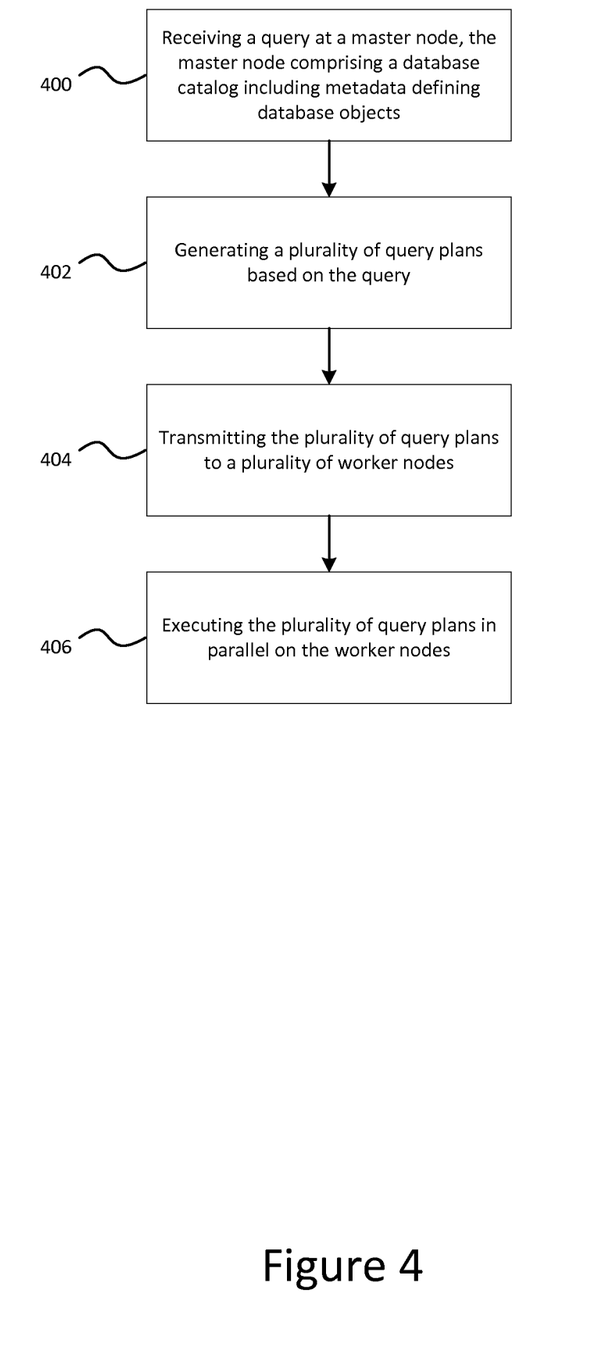
FIG. 4 illustrates a flowchart of a method for executing a query in parallel on a parallel processing database using a shared metadata catalog in accordance with some embodiments of the present invention.

FIG. 4 depicts a method similar to FIG. 3 for executing query plans in parallel on a database cluster. At 400 a query is received at a master node, where the master node comprises a metadata catalog. The catalog may include metadata defining database objects, as discussed above.

At block 402, the master node may generate a plurality of query plans. These plans could be generated, for example, using query dispatcher 206. At 404, these plans may be distributed to a plurality of worker nodes in the database cluster, and at 406 the plans may be executed.

Figure 5:
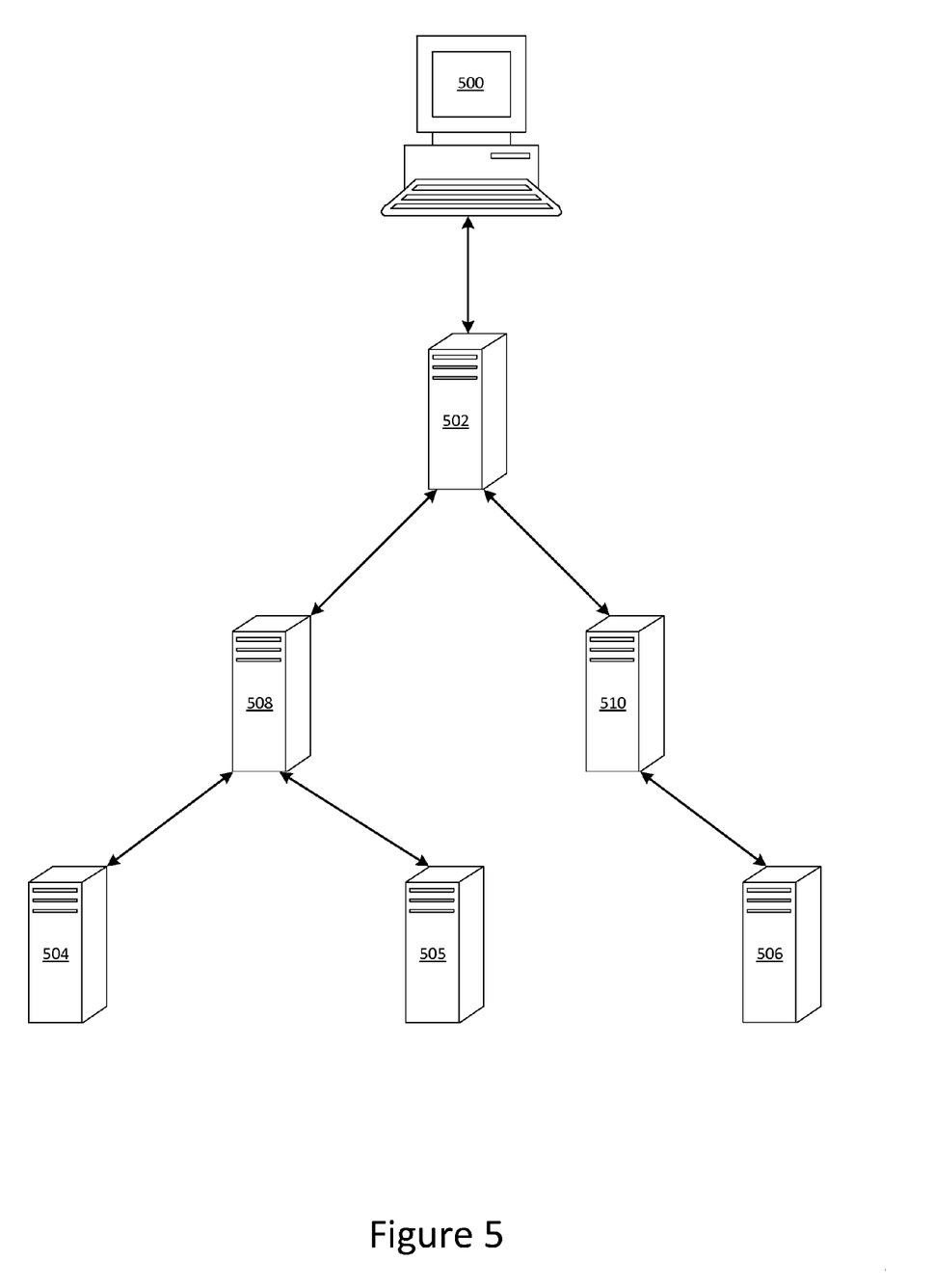
FIG. 5 illustrates a system architecture for locating execution metadata using a tree structure in accordance with some embodiments of the present invention.

Turning now to FIG. 5, a system for locating query metadata is shown. As previously discussed, a worker node may transmit a request to the master node when the worker does not have all the necessary metadata for executing a query plan. When there are only a few nodes in the cluster, this may be an efficient way of obtaining the missing metadata. As the cluster size increases, however, this approach may become more costly. For example, if there are ten thousand nodes in a cluster, additional metadata may be requested from up to ten thousand locations. The system may not have sufficient bandwidth, and the master node may not have enough processing resources, to handle this number of consecutive connections.

The architecture shown in FIG. 5 may help overcome these issues. Worker nodes 504, 505, 506, 508, and 510 may be configured in a tree structure, and master node 502 may be a root node. Master node 502 may receive a query from client 500, may develop query plans for that query, and may distribute the query plans and needed metadata to the worker nodes. This process may be substantially similar to the processes discussed above. In an embodiment, master node 502 may distribute the query plans and metadata directly to each worker node. In other words, master node 502 has a connection to each worker node and may transmit the query plans and metadata without using the shown tree structure.

Once a worker node has received a query plan and some associated metadata, that node may begin processing the plan. In an embodiment, a worker node may need additional metadata that was not included in the original transmission from the master node. As discussed above, worker node may send a request to a master node for the additional metadata. This may, however, result in an unmanageable number of connections to the master node if multiple worker nodes make similar requests.

In some embodiments, rather than transmitting a request directly to the master node, the worker node may request additional metadata from a parent in the tree structure. Since the master node distributes metadata to all the nodes in the cluster, a parent of the present worker node may have the additional metadata stored in cache. If the immediate parent does not have the additional metadata, the successive parents may be queried until the metadata is found or the master node is reached. Once the additional metadata is found, whether on an ancestor or the master node, it may be transmitted back to the requesting worker node. This may allow a very large number of nodes in a cluster to request additional metadata, without opening an unmanageable number of connections to the master node.

For example, master node 502 may transmit a query plan and some metadata to worker node 505. Worker node 505 may determine that additional metadata is necessary to execute the query plan. Rather than requesting the additional metadata directly from master node 502 (which contains the metadata catalog), worker node 505 may request the metadata from its parent worker node 508. Worker node 508 may check its cache and return the additional metadata to node 505 if the metadata is found. If the additional metadata is not found, worker node 508 may forward the request to the next parent, which is master node 502. Master node 502 may retrieve the additional metadata from the metadata catalog and transmit it to the original requesting worker node 505.

In some embodiments, requests for additional metadata may be forwarded up the tree structure as just described. Each node may know its parent, and if the metadata is not found in the local cache the node may forward the request to that parent. The tree structure may be particularly beneficial because new nodes can be added or removed without updating information on every node in the cluster. In some embodiments, however, each worker node may be responsible for maintaining its own ancestry. For example, worker node 505 may know its parents are worker node 508 and master node 502. If a request for additional metadata is sent to worker node 508 and the metadata is not found, worker node 505 may submit the request to master node 502 directly rather than having the request forwarded by worker node 508.

Additionally or alternatively, no tree structure may be used. Each worker node may maintain a list or directory of other worker nodes. If additional metadata is needed, the worker node may iterate through this list and make calls to the other worker nodes. The master node may only be called once the list is exhausted without locating the additional metadata. The requests may be sent to the nodes on the list one at a time, or a request may be sent to all the nodes at the same time.

In some embodiments, requests for additional metadata may be transmitted throughout the system as a multicast request. In such an embodiment, a request may only be made to the master node if no other node responds within a defined time frame.

Figure 6:
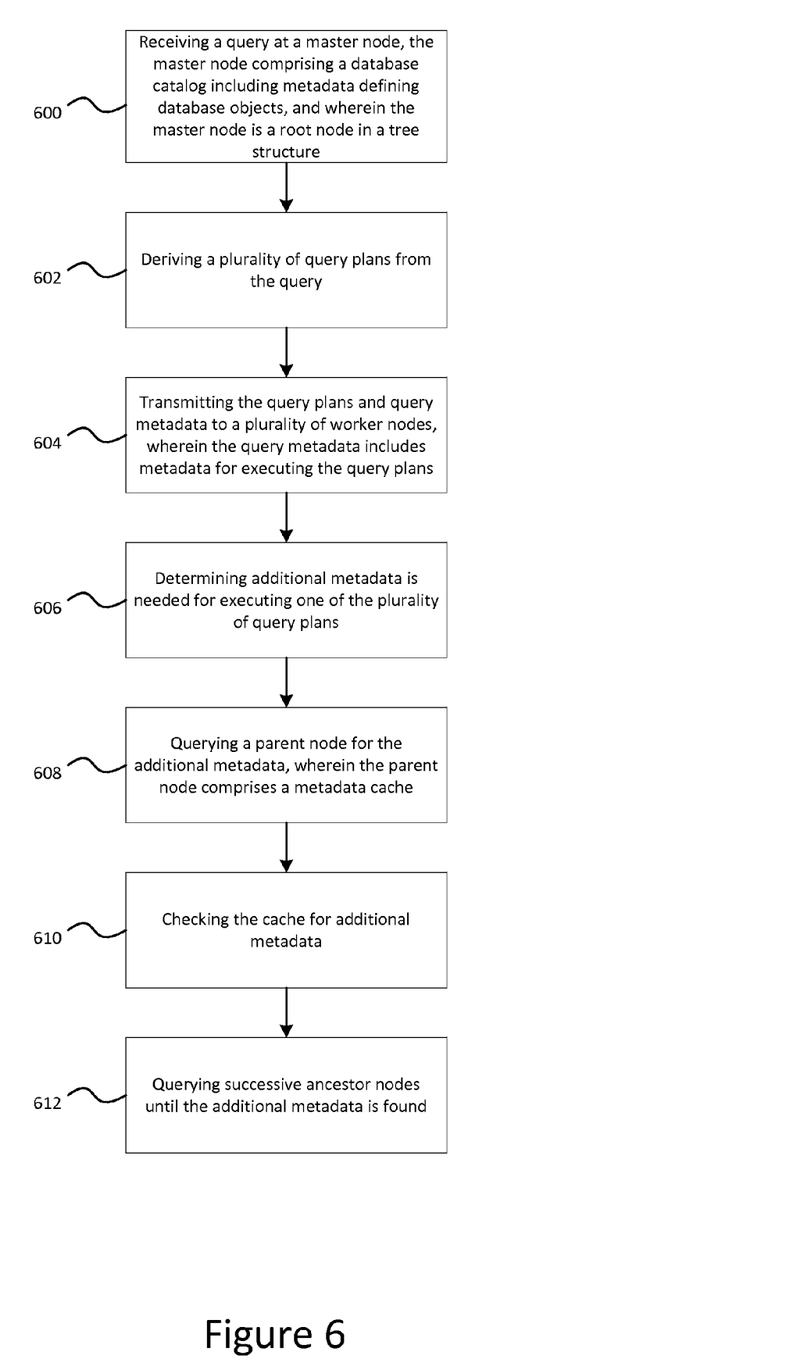
FIG. 6 illustrates a flowchart of a method for locating execution metadata using a tree structure in accordance with some embodiments of the present invention.

Turning now to FIG. 6, a method for locating additional metadata using a tree structure is discussed. At block 600, a query is received at a master node. The master node may comprise a database catalog that includes metadata defining database objects. The master node may be the root node in a tree structure, and in an embodiment may be substantially similar to master node 502.

At 602 a plurality of query plans may be derived from the query, and at 604 these plans may be distributed to a plurality of worker nodes. In an embodiment, the worker nodes may be similar to worker nodes 504, 505, 506, 508, and 510. Query metadata may be distributed with the plans, where the query metadata includes metadata necessary for executing the plans.

At 606, one or more of the worker nodes may determine they need additional metadata to execute the query plan, and at 608 this worker node may query a parent for the additional metadata. In an embodiment, this parent node may be another worker node, and may comprise a metadata cache. This metadata cache may be substantially similar to the cache discussed in reference to FIG. 3.

At 610, the cache on the parent node is checked for the metadata. If the metadata is found, it may be transmitted to the worker node making the request. If the metadata is not found, successive ancestor nodes may be queried at 612 until the additional metadata is found in a parent worker node's cache, or the master node is reached.

For the sake of clarity, the processes and methods herein have been illustrated with a specific flow, but it should be understood that other sequences may be possible and that some may be performed in parallel, without departing from the spirit of the invention. Additionally, steps may be subdivided or combined. As disclosed herein, software written in accordance with the present invention may be stored in some form of computer-readable medium, such as memory or CD-ROM, or transmitted over a network, and executed by a processor.

All references cited herein are intended to be incorporated by reference. Although the present invention has been described above in terms of specific embodiments, it is anticipated that alterations and modifications to this invention will no doubt become apparent to those skilled in the art and may be practiced within the scope and equivalents of the appended claims. More than one computer may be used, such as by using multiple computers in a parallel or load-sharing arrangement or distributing tasks across multiple computers such that, as a whole, they perform the functions of the components identified herein; i.e. they take the place of a single computer. Various functions described above may be performed by a single process or groups of processes, on a single computer or distributed over several computers. Processes may invoke other processes to handle certain tasks. A single storage device may be used, or several may be used to take the place of a single storage device. The disclosed embodiments are illustrative and not restrictive, and the invention is not to be limited to the details given herein. There are many alternative ways of implementing the invention. It is therefore intended that the disclosure and following claims be interpreted as covering all such alterations and modifications as fall within the true spirit and scope of the invention.

What is claimed is:

1. A parallel processing database system, comprising:
   a master node comprising a processor and a database catalog, wherein the database catalog includes metadata defining database objects, and wherein the master node is configured to receive a query from a client node, wherein the master node includes a query dispatcher that receives the query from the client node, develops the query plan based at least in part on the query, and communicates the query plan to a worker node in connection with metadata from the database catalog that the query dispatcher determines is required for execution of the query plan; and
   the worker node, wherein the worker node is in communication with the master node such that the worker node receives a query plan from the master node, and the worker node comprising a processor and a query execution process, wherein the processor runs the query execution process so as to execute at least a part of the query in connection with executing the query plan received from the master node, and wherein in an event that the worker node requires additional metadata in connection with executing the at least the part of the query, the processor makes a request, for the additional metadata, to a parent node corresponding to the worker node in relation to a hierarchical structure of nodes,
   wherein the hierarchical structure of nodes includes the master node, the worker node, and the parent node arranged in a hierarchy, and
   wherein in the event that the parent node does not have the additional metadata, the parent node forwards the request for the additional metadata to the next parent node in the hierarchical structure of nodes.

2. The system of claim 1, wherein the master node comprises a processor and a non-transitory computer readable storage medium.

3. The system of claim 1, wherein the worker node comprises a processor and a non-transitory computer readable storage medium.

4. The system of claim 1, wherein the query execution process executes a database query received from the master node, and wherein the query plan is included in the database query received from the master node.

5. The system of claim 4, wherein the database query comprises a query plan and query metadata.

6. The system of claim 5, wherein the query metadata is stored in the database catalog.

7. The system of claim 1, wherein the master node comprises a query dispatch process.

8. The system of claim 7, wherein the query dispatch process receives the query from the client.

9. The system of claim 8, wherein the query dispatch process creates the query plan from the query.

10. The system of claim 9, wherein the query dispatch process transmits the query plan to the worker node.

11. The system of claim 7, wherein the query dispatch process retrieves query metadata from the database catalog.

12. The system of claim 11, wherein the query dispatch process transmits the query metadata to the worker node.

13. The system of claim 7, wherein the query dispatch process transmits a query plan and query metadata concurrently to the worker node.

14. The system of claim 1, further comprising a plurality of worker nodes.

15. The system of claim 14, wherein the master node transmits a plurality of query plans and query metadata to the plurality of worker nodes.

16. The system of claim 15, wherein the plurality of worker nodes execute the query plans in parallel.

17. The system of claim 1, wherein the database objects comprise database table definitions, database functions, database users, database views, and database indexes.

18. The system of claim 1, wherein the worker node comprises a non-transitory computer readable storage medium.

19. The system of claim 1, wherein the query execution process of the worker node executes the query plan using at least the metadata received from the master node.

20. The system of claim 1, wherein the parent node is another worker node connected to the master node via the hierarchical structure.

21. The system of claim 1, wherein the worker node stores its ancestry in relation to the hierarchical structure of nodes.

22. The system of claim 1, wherein in an event that a change is made to the metadata in the database catalog, the change is not propagated to the worker nodes to update a database at the worker nodes.

* * * * *